Oct. 17, 1950     L. B. GLANTZ     2,526,553
DRILL CLAMP
Filed Nov. 25, 1947

Ludwig B. Glantz
INVENTOR.

Patented Oct. 17, 1950

2,526,553

UNITED STATES PATENT OFFICE 2,526,553

DRILL CLAMP

Ludwig B. Glantz, Minden, Nebr.

Application November 25, 1947, Serial No. 788,004

4 Claims. (Cl. 77—63)

This invention relates generally to tools, and more particularly to a work holder for use with drill presses and the like to retain the work rigidly on the table of the press during a drilling operation, or for analogous uses with other machines.

A primary object of this invention is to provide a work holder which may be used in conjunction with its own column removably securable to the table of the machine tool, or alternatively for securement to the column of the drill press or the like.

A further object of this invention is to provide a work holder in which a single operation, that of tightening a screw, simultaneously tightens the work holder on the said column and urges the work holding arm downwardly into contact with the work on the table, thereby obviating a disadvantage encountered in other types of work holders which have a tendency to shift the work on the table during the clamping operation. With the instant invention, the work may be easily held by hand in proper position while this improved clamping means is applied to the work.

Still another object of this invention is to generally simplify the construction of a work holder of the type mentioned above and to provide a work holder which is exceedingly versatile in use.

And a last object to be specifically mentioned is to provide a device of this character which is relatively inexpensive and practicable to manufacture, which is simple, convenient and safe to use, and which will give generally efficient and durable service.

With these objects definitely in view, together with other objects which will appear hereinafter as this description proceeds, this invention resides in certain novel features of construction, combination and arrangement of parts and portions as will be hereinafter described in detail in the specification, particularly pointed out in the appended claims, and illustrated in the accompanying drawings which form a material part of this application, and in which:

Figure 1 is a side elevational view of a drill press with this invention operatively applied thereto, the form of this invention illustrated including a small removable column which is secured to the table of the press, portions of this column and table being broken away to disclose the underlying parts in vertical cross-section and elevation;

Figure 2 is a perspective view showing this invention applied directly to the column of a drill press, a fragmentary portion of the latter being shown, the figure also including a chuck, drill bit and a piece of work all shown in dash line, in order to illustrate more clearly how this invention is used, and it should be noted that in this figure the small column illustrated in Figure 1, is deleted;

Similar characters of reference designate similar or identical parts and portions throughout the specification and throughout the several views of the drawing.

Figure 1:
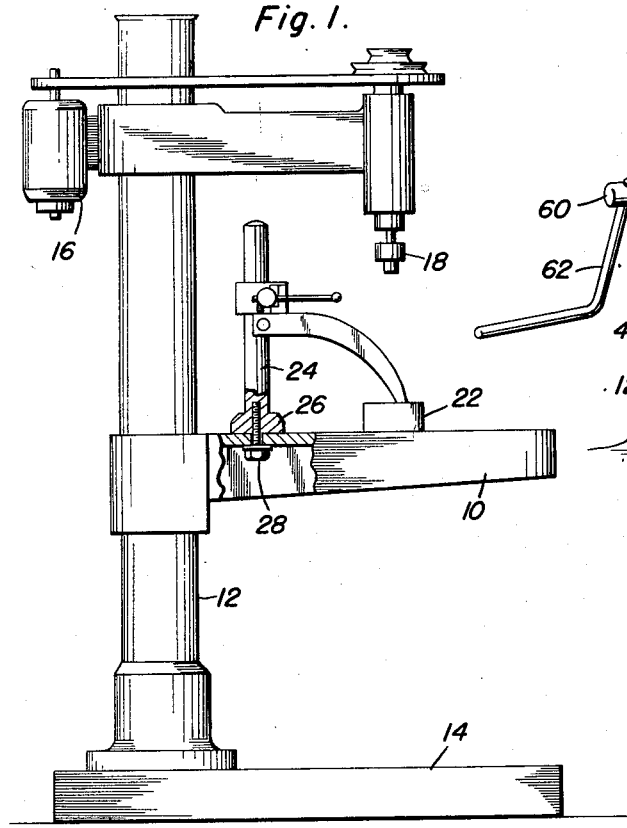
Figure 2:
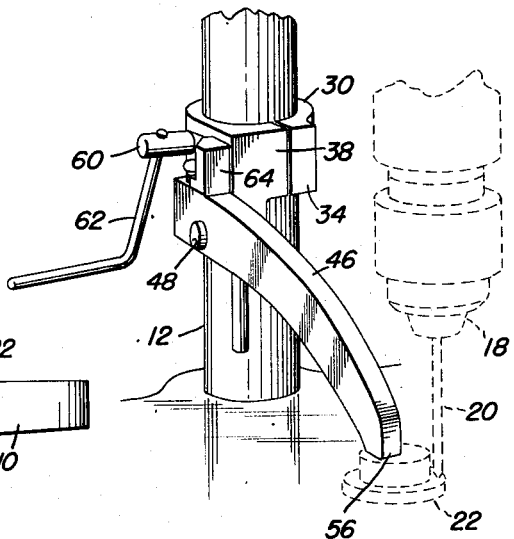
Figure 3:
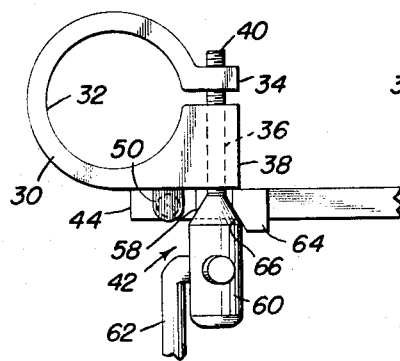
Figure 3 is a fragmentary top plan view of this invention.
Figure 4:
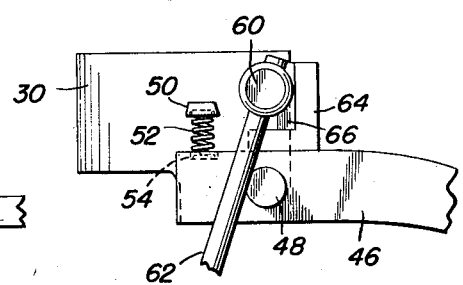
Figure 4 is an enlarged fragmentary side elevational view of the structure illustrated in Figure 3.

Referring now to the drawing in detail, it will be noted that the environment wherewith this invention is adapted to be used will include ordinarily a machine tool such as a drill press having a table 10 and a column 12 supported on a base 14. Such a drill press will also include a complement of parts including a motor 16 operatively connected to drive a chuck 15 and a drill bit 20.

This invention is adapted to hold work, illustrated at 22, firmly in place upon the table 10 during a machining operation, such as drilling a hole in the work by the bit 20. A cylindrical column 24 having an enlarged base 26 axially bored and tapped to receive an attaching stud 28 is adapted to be rigidly secured to the table 10, as illustrated in Figure 1.

A clamp 30 having a recess 32 designed to receive the column 24 is provided with a threaded terminal 34 and a bore 36 in the enlarged portion 38 to receive the threaded portion 40 of the member generally indicated by the numeral 42. The clamp 30 is provided with a downwardly and outwardly extending portion 44 to which is pivoted the work clamping arm 46, by means of a pivot pin 48. A small boss 50 is positioned on the side of the clamp immediately above the upper end of the arm 46 and a spring 52 is compressed between this boss 50 and the said upper end of the arm which is recessed, as at 54 to retain the lower end of the spring 52 in position.

The arm 46 is preferably curved, as indicated in the figures, and the lower end 56 of the arm will ordinarily be formed with a flat work engaging face, although various means may be used to adapt this arm for specialized use in holding different articles.

The member 42 is formed with a conical portion 58 and an enlarged end portion 60 which latter is transversely bored to receive an actuating handle 62. A lug 64 formed integrally on the upper side of the arm 46 above the pivot 48 is provided with a cam face 66 for engaging the conical portion 58.

In operation, turning of the member 42 will force the lug 64 to move outwardly at the same time as the terminal 34 is pulled toward the part 38, while rotation of the member 42 in the opposite direction will allow the clamp 30 to be released with the simultaneous upward movement of the arm 36 under the influence of the spring 52.

The general operation of this invention will be clearly understood from the foregoing description of the mechanical details thereof taken in connection with the above recitation of the objects sought to be achieved by this invention.

Further description would, therefore, appear to be unnecessary, but it may be well to add that the clamp may be made of suitable size for mounting the same on the pillar or column 12 and that the small removable column 34 need not then be used. However, the column will ordinarily be supplied with this tool, in order that the same may be used with drill presses and other machine tools and the like having square columns or otherwise not adapted for the direct attachment of the clamp 30.

Many minor variations may be made in the exact construction and proportionment of the various parts of this invention, all within the spirit and scope thereof, and this invention should be limited only in accordance with a proper interpretation of the terminology used in the appended claims.

Having described the invention what is claimed as new is:

1. A work holder for use with a columnar support comprising a clamp, a work contacting arm pivoted on said clamp, and means to move said arm in one direction, said means simultaneously tightening said clamp on said support, said clamp comprising a split collar adapted to engage said support, and said means including a member threadedly associated with the clamp, a conical portion on said member, and a cam face on said arm engaging said cone.

2. A holder according to claim 1 and including a spring operatively mounted between portions of the clamp and arm to bias the arm for movement away from the work.

3. A work holder comprising a columnar support, a split collar slidable on said support, a clamping bolt for said split collar having a shank portion threadedly engaging one terminal of the collar and an enlargement engaging the other terminal of said collar, a work contacting arm pivoted at one end on said other terminal, a cam face on said arm, and a conical portion of said enlargement engaging said cam face, whereby the collar is clamped upon said support and the arm is forced to pivot when said bolt is rotated in one direction.

4. A work holder comprising a split clamp, a clamping bolt therefor, an arm pivoted on said clamp and having a cam face thereon, said bolt having a conical enlargement engaging said cam face, so that rotation of the bolt in one direction moves said enlargement into engagement with said cam face moving said arm in one direction and simultaneously closing said clamp, and a support of columnar form, said clamp being slidably mounted on said support.

LUDWIG B. GLANTZ.

REFERENCES CITED

The following references are of record in the file of this patent:

UNITED STATES PATENTS

| Number | Name | Date |
| --- | --- | --- |
| 162,866 | Squire | May 4, 1875 |
| 2,043,125 | Stahl | June 2, 1936 |
| 2,254,281 | Grey | Sept. 2, 1941 |
| 2,269,727 | Mead | Jan. 13, 1942 |
| 2,322,707 | Wetzler | June 22, 1943 |
| 2,430,900 | Wetzler | Nov. 18, 1947 |

FOREIGN PATENTS

| Number | Country | Date |
| --- | --- | --- |
| 269,395 | Germany | Jan. 20, 1914 |